B. E. RICHARDSON.
GEAR SHIFT.
APPLICATION FILED FEB. 23, 1915.

1,229,655.

Patented June 12, 1917.
3 SHEETS—SHEET 1.

Witnesses
Howard H. Yarrington
Marie York

Inventor
Bayard E. Richardson
By Moulton & Livrance,
Attorneys.

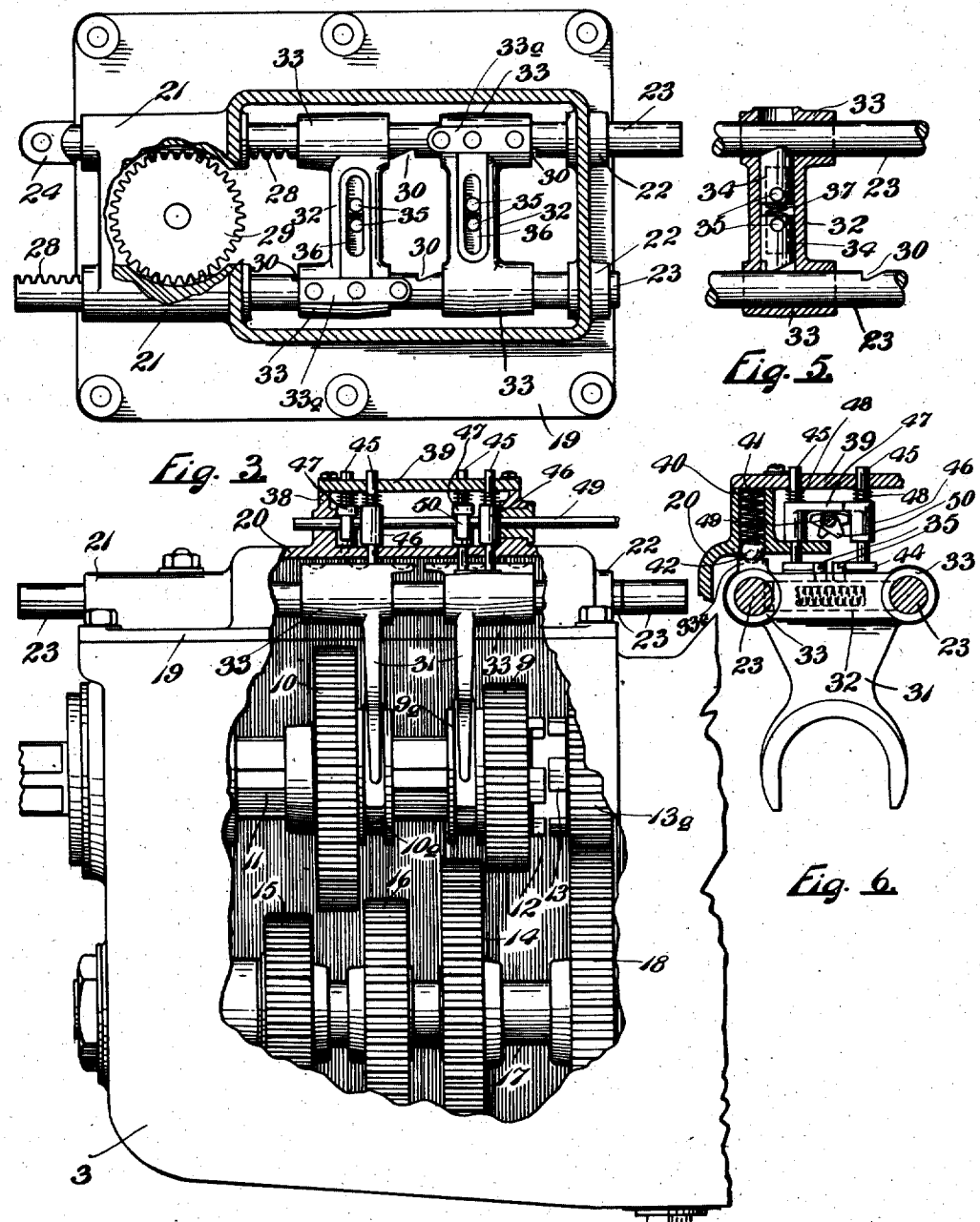
B. E. RICHARDSON.
GEAR SHIFT.
APPLICATION FILED FEB. 23, 1915.
1,229,655.
Patented June 12, 1917.
3 SHEETS—SHEET 2.
Witnesses
Howard H. Garrington
Marie York
Inventor
Bayard E. Richardson
By Moulton & Livrance
Attorneys.

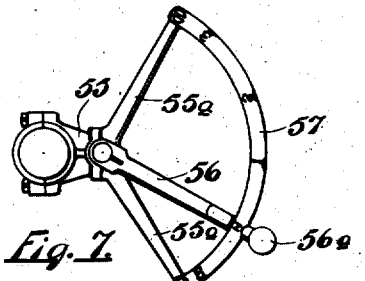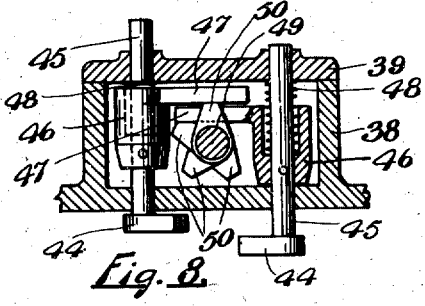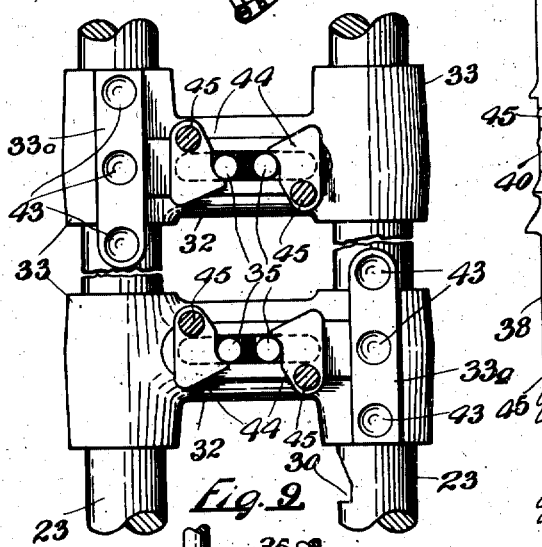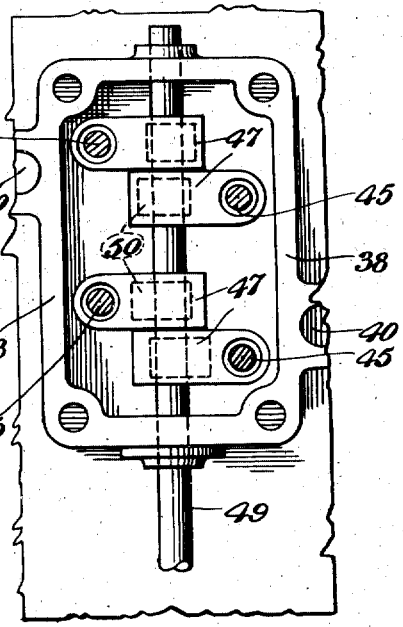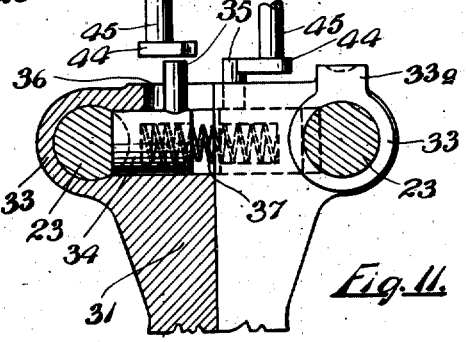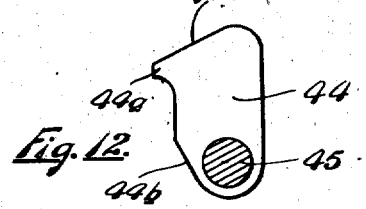

UNITED STATES PATENT OFFICE.

BAYARD E. RICHARDSON, OF GRAND RAPIDS, MICHIGAN, ASSIGNOR TO MECHANO GEAR SHIFT CO., OF GRAND RAPIDS, MICHIGAN, A CORPORATION OF MICHIGAN.

GEAR-SHIFT.

1,229,655. Specification of Letters Patent. Patented June 12, 1917.

Application filed February 23, 1915. Serial No. 9,937.

*To all whom it may concern:*

Be it known that I, BAYARD E. RICHARDSON, a citizen of the United States of America, residing at Grand Rapids, in the county of Kent and State of Michigan, have invented certain new and useful Improvements in Gear-Shifts; and I do hereby declare the following to be a full, clear, and exact description of the invention, such as will enable others skilled in the art to which it appertains to make and use the same.

This invention is related to and used in connection with change speed gear transmissions and it relates especially to a means for selecting and shifting gears in a sliding gear transmission in automobiles, the shifting of the gear being accomplished by suitable operation of the clutch pedal of the automobile. It is the object and purpose of the invention to provide a mechanism of this character of very simple construction, efficient in operation and consisting of comparatively few and simple parts; and to further provide such mechanism with various new and useful features of construction and operation which will be apparent upon an understanding being had of the embodiment disclosed in the accompanying drawings, in which;

Fig. 3 is a plan view of that part of the shifting mechanism associated directly with the shifting rods.

Fig. 4 is a side elevation with parts broken away and other parts in section showing the application of the shifting mechanism to a sliding gear transmission.

Fig. 5 is a horizontal section taken through the upper portion of one of the shifting yokes.

Fig. 6 is a fragmentary vertical sectional view through the shifting mechanism.

Fig. 7 illustrates in plan the selecting arc and lever forming a part of the selective mechanism.

Fig. 8 is an enlarged fragmentary vertical sectional view through a portion of the shifting mechanism.

Fig. 9 illustrates in plan and partially in section the mechanism also shown in Fig. 3 having additional parts associated therewith.

Fig. 10 is a plan view of the auxiliary housing inclosing a part of the shifting mechanism with the upper plate removed.

Fig. 11 is a vertical sectional view through the upper part of one of the shifting yokes; and Fig. 12 is a plan view of an element of the selective means forming a part of the mechanism.

Like reference characters refer to like parts throughout the several views of the drawings.

Figure 1:
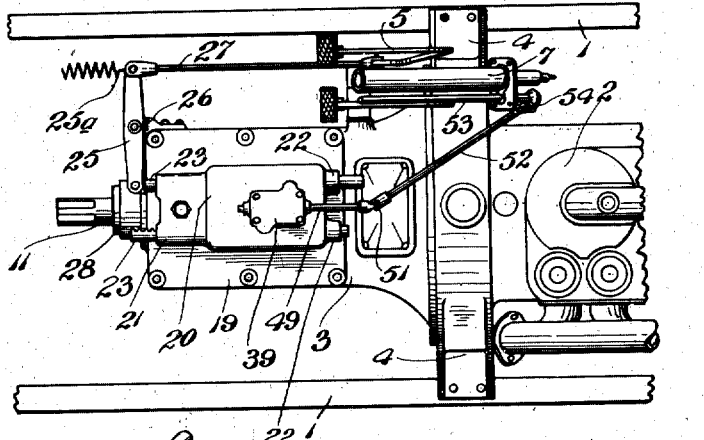
Figure 1 is a plan view showing the rear portion of a power plant of an automobile with my gear shift applied thereto.
Figure 2:
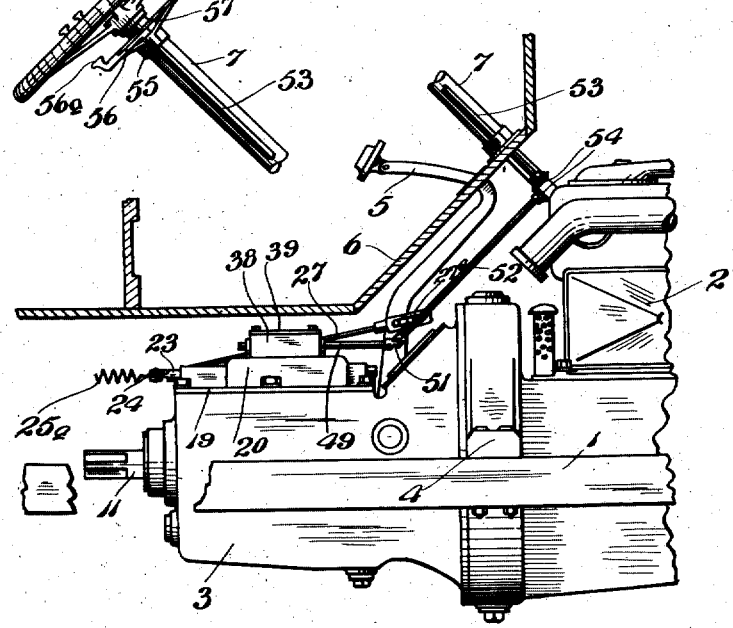
Fig. 2 is a side elevation thereof.

My invention is shown applied to an automobile of ordinary construction having the usual spaced apart chassis members 1 which support and carry the power plant of the machine including the engine 2 and the gear casing 3 connected at the rear of the engine casing as shown, outwardly extending supporting arms 4 bearing on the upper side of the members 1 to support the power plant as shown. The power plant includes the usual clutch operable by the usual clutch pedal 5 extending upwardly and to the rear through the inclined section 6 of the floor of the front compartment of the automobile. A steering post 7 at its upper end supporting a steering wheel 8 is also present as in substantially all automobile constructions.

The change of speed gearing is of conventional construction including gears 9 and 10 slidably mounted upon the squared shaft 11 which normally connects in any suitable manner with the driving shaft of the automobile. On its forward face gear 9 is provided with a clutch 12 adapted to engage with a similar clutch 13 carried on the rear face of the gear 13ª which is secured to the crank-shaft of the engine. Gears 14, 15 and 16 are fixed on a counter shaft 17, the gear 10 being adapted to be driven by either gear 15 or 16 when moved to proper position and the gear 9 by the gear 14 while a further gear 18 meshes with and is driven continuously by the gear 13ª. It is of course understood that an idle pinion interposes between gears 10 and 15 for the purpose of reverse driving of the shaft 11. This is an ordinary construction of sliding gear transmission making possible a change of speed of shaft 11 with reference to the crank-shaft of the engine in three different relations in the same direction of rotation as the crank shaft and one in the reverse direction of movement.

The gear casing 3 is inclosed by a cover 19 integral with which is formed a housing 20 having at one end two spaced apart sleeves 21 and at the other end similar spaced apart bosses 22 serving as supports and guides for the shifting rods 23 slidably mounted therein. The rear end of one of the rods is flattened as shown at 24 to provide a convenient attachment to the lever 25 pivotally mounted substantially midway between its ends on a bracket 26 and having connected at its opposite end a rod 27 which passes forwardly and has engagement with the clutch pedal 5. It will be noted that at the forward end of rod 27 a member 27a provided with a longitudinal slot receives a pin 5a secured to the clutch pedal. When the pedal is depressed no movement of the rod 27 takes place until the pin has traversed the length of said slot or until the clutch has been operated to disengage the driving and crank-shafts. Rods 23 are formed with racks 28 at their rear ends and a pinion 29 is mounted between and engages with the racks whereby movement of one rod in one direction simultaneously causes an equal movement of the other rod in the opposite direction. Each of the rods is further provided with a pair of spaced apart notches 30 of the formation shown and including each one a beveled side and also a side cut at right angles to the axis of the rod, and it will be further noted that the beveled sides of said notches in one rod extend in a direction opposite to the similar sides of the notches in the opposite rod.

The yokes 31 are associated with the sliding gears in the transmission, one engaging with a collar 9a on the gear 9 and the other with a similar collar 10a on the gear 10. Said yokes extend upwardly and at their upper ends connect integrally with a tubular member 32 positioned between the rods 23 and formed at each end with a sleeve 33 to loosely receive said rods. Within each tube 32, two catches 34 are loosely mounted, each having a pin 35 projecting upwardly through an elongated slot 36 formed in the tube. The catches are bored for a portion of their length and a coil spring 37 under compression is located between the catches and seats at its ends in the openings thus formed, tending to force the catches away from each other and press their outer ends against the shifting rods 23. Each of the catches at its outer end is suitably formed to be received in a notch 30 of the rod 23 associated therewith when the rod is moved so that a notch comes opposite the end of the catch.

Above the housing 20 an auxiliary housing formed of inclosing sides 38 and a cover 39 is located and in the walls of the housing a pair of vertical openings 40 are made each adapted to receive a coil spring 41 under compression and bearing at its lower end on a ball 42 adapted to seat in the recesses 43, three of which are formed in the integral upper extensions 33a of one sleeve 33 associated with each yoke 31. It will be evident that when a yoke is moved so that the ball 42 seats in any one of the three depressions 43 the yoke will tend to remain in position yielding however upon the application of sufficient force.

Four irregular shaped members 44 are provided, one for each pin 35 and are carried at the lower ends of rods 45 extending upwardly through the top of housing 20, housing 38 and cover 39 as best shown in Fig. 8. Each of the pins has secured thereto a sleeve 46 having an integral arm 47 projecting horizontally toward the opposite side of the housing 38. A coil spring 48 surrounding the rod 45 and lying between sleeve 46 and cover 39 normally tends to hold rod 45 and its member 44 in lowermost position. When in such position and with the yokes at neutral, that is with no gear in transmitting position, the pins 35 are each engaged by the members 44 and rest against the projections 44a thereof as shown. It will be clear that when in such position, as shown fully in Fig. 9, the catches 34 are restrained from movement but that if any rod 45 is elevated the associated catch is released and may seat in a notch 30 when a rod 23 is moved to proper position.

Positioned lengthwise of the housing 38 is a rod 49 having secured thereto four cams 50, one for each of the arms 47 and lying in the same vertical planes with said arms. Rods 49 projects forwardly and is connected by the universal joint 51 with the shaft 52 which in turn is connected at its forward end with a rod 53 lying parallel to the steering post 7, bevel gears 54 carried respectively by rod 53 and shaft 52 connecting them so that when rod 53 is rotated, shaft 52 will simultaneously operate causing the rotation of the rod 49. The upper end of rod 53 extends to a point slightly below the steering wheel 8 being received through a sleeve on the bracket 55 and having connected above said bracket a lever 56 terminating in an operating handle 56a. An arc 57 is supported by arms 55a of the bracket 55 and the operating handle is adapted to swing along the outer edge of the arc and be retained at any one of the five positions marked respectively "R," "N," 1, 2 and 3, denoting reverse, neutral and first, second and third forward speeds. The relation of the parts is such that when the operating handle is stopped at any particular notch for instance the one marked 2, the shaft 49 will be rotated so that the cam 50 thereon corresponding to second speed, will come under its associated arm 47 and elevate the member 44 associated with the catch 34 the release of which will have the effect of producing the second speed in the transmission when the clutch pedal is thereafter operated to its extreme forward position. For instance, suppose the engagement of gears 9 and 14 produces the second speed and this speed is desired. The yoke 31 connected with gear 9 accordingly must be carried to the rear. The forward left hand catch 34 is the one to be liberated by elevating its associated member 44 so that when the forward movement of the clutch pedal takes place and the left hand rod 23 is carried to the rear the catch seats in the forward notch 30 whereby tube 32 and its associated yoke 33 are carried rearwardly accomplishing the desired engagement of gears. The same result will be obtained for any other speed except that of course, for certain speeds the yoke must be carried forwardly instead of to the rear in which case the action will be accomplished by the right hand rod 23 engaging with the proper catch released for that purpose. Suppose a gear is in transmitting position, the yoke will either be in front of or to the rear of its neutral position as shown in Figs. 3, 4, 5 and 9. As the members 44 are relatively stationary the movement of the yoke has carried its associated pins 35 away from their members 44 releasing both of the catches of any yoke that is away from neutral position. Accordingly on movement of the clutch pedal beyond clutch releasing position the catches engaging with the notch 30 in the rods 23 operate to carry the yoke back to neutral position; and it will be observed as this takes place, the pins will ride up the inclined edges 44$^b$ and 44$^c$ of the members 44 whereby as the yoke reaches neutral position the catches will have disengaged from the notches leaving the rods free for slidable movement in the sleeves 33. This will occur when the lever 56 is moved to the notch N, the cams 50 in such case being positioned as shown in Fig. 6.

If instead of the neutral position of the gears, a change from one speed to another is made, the only difference is that one of the members 44 corresponding to the selected speed is elevated by moving the selecting lever 56 to the proper position and then, as the forward movement of the clutch pedal is carried out, instead of the yokes remaining at neutral position the selected yoke is carried by engagement of one of its catches 34 with one of the rods 23 to the desired position for transmission according to the selected speed. It should be borne in mind that at all times by reason of the connection of the clutch pedal 27$^a$ no operation of the shifting mechanism occurs at all until the clutch members have been disengaged, that the next operation effected by the forward movement of the clutch is the neutralization of any gear that may be in transmitting position followed, on the final portion of the forward movement of the clutch pedal by the shifting of the selected gear into transmitting position. The clutch pedal may then be released and will return to its normal position and I have provided a coiled spring 25$^a$ connected to the end of the lever 25, the influence of which is to draw the rod 27, lever 25 and connected rods 23 to their normal position as fast as the return movement of clutch pedal 58 permits.

From the foregoing it will be seen that I have provided a shifting mechanism of few parts readily and simply operated and one in which the cost of manufacture is very low due partially to the fact that the regular closure for the gear casing is eliminated and a new one supplied which carries substantially all of the immediate shifting mechanism. Many variations in the selective mechanism may be used and also changes in the shifting mechanism will occur to others without departing from my invention. Accordingly I consider myself entitled to all constructions falling within the scope of the appended claims.

I claim:—

1. In combination, sliding gears, shifting rods movably mounted, shifting devices engaging with the gears and loosely mounted on the rods, means to move the rods, and selective mechanism for causing the operative connections of a shifting device with a rod to thereby shift a gear of the transmission.

2. In combination, sliding gears, shifting devices connected therewith, spaced apart shifting rods loosely carrying the shifting devices, means for simultaneously moving the rods in opposite directions, and selective means for causing the operative connection of any shifting device with any shifting rod.

3. In combination, sliding gears, shifting devices connected therewith, each including a tubular member having a sleeve at each end thereof, spaced apart shifting rods loosely received in the sleeves, each rod having notches therein, catches in the tubular members normally adapted to engage in a notch in a shifting rod, means to normally hold the catches away from the notches, means to release any desired catch, and means to movably operate the shifting rods.

4. In combination, sliding gears, shifting devices connected therewith, shifting rods slidably mounted adjacent the gears on which the shifting devices are loosely mounted, a pedal, means connecting the pedal and one of the shifting rods for slidable operation of the rod on movement of the pedal, means connecting the shifting rods whereby as one is slidably moved, the other is similarly moved in the opposite direction, and selective means for connecting any shifting device with any rod.

5. In combination, gears movably mounted, shifting devices connected thereto, shifting rods slidably mounted and loosely carrying the shifting elements, means to slidably operate one of the shifting rods, means to cause the simultaneous slidable movement in the opposite direction of the other shifting rod, catches carried by the shifting devices one for each rod adapted to engage with the shifting rods but normally held out of engagement, and means to selectively cause the engagement of a catch with its associated shifting rod.

6. In combination, sliding gears, yokes connected thereto, tubes carried at the upper ends of the yokes each provided with a sleeve at each end, shifting rods slidably mounted and loosely received through the sleeves, a pair of oppositely disposed catches loosely mounted in each tube adapted to engage with notches in the shifting rods, means normally forcing the catches apart, pins projecting from the catches through the tubes, and devices engaging with the pins to hold the catches in disengaged position, said devices being movable to release the pins, and means to move any device to releasing position.

7. In combination, sliding gears, shifting devices connected thereto, shifting rods slidably mounted and loosely received by the shifting devices, a pair of catches mounted on each shifting device adapted to engage with the shifting rods, means normally holding the catches in disengaged position comprising a pin on each catch and a member engaging against the pin, a plurality of horizontal arms, one for each member connected to the members, a rod provided with a plurality of cams, one for each arm, rotatively mounted under the arms, means to rotate the rod to thereby elevate the arms and associated members for release of the catches, and means to slidably operate the shifting rods simultaneously in opposite directions.

8. In combination, slidably mounted shifting rods, means for operating said rods simultaneously in opposite directions, shifting devices carried by and between the rods and loosely mounted thereon, catches movably mounted on each shifting device, one for each rod, means for causing the engagement of the catches and shifting rods, a pin attached to each catch, a member engaging with each pin, a rod connected to each member mounted for vertical movements, a rod mounted for rotation and carrying a plurality of cams, one for each member, means whereby the movement of a cam on rotation of the rod will elevate its associated member releasing the catch, and means to rotate the rod.

9. In combination, shiftable gears, shifting devices attached thereto, shifting rods loosely carrying the shifting devices, means to operate the shifting rods simultaneously in opposite directions, means to selectively cause the engagement of any shifting rod with any shifting element, said engagement occurring after the rods have been moved a predetermined distance, substantially as described.

10. In combination, sliding gears, a pedal, shifting devices associated with the gears, slidably mounted shifting rods loosely carrying the shifting devices, means for operating the shifting rods in opposite directions, means connecting the rods to the pedal for slidable operation thereof on movement of the pedal, means interposed between the shifting devices and rods for operatively engaging any shifting rod with any shifting device, means for selecting any desired engagement of shifting device and rod, and means for returning any shifting device that is away from neutral position to neutral position prior to the accomplishment of the engagement of the selected shifting device and rod.

11. In a device for shifting gears the combination with reciprocable bars, of shifting forks slidably mounted thereon, means for locking said forks to said bars, a control for said locking means and mechanism for reciprocating said bars in opposite directions.

12. In a device for shifting gears the combination with reciprocable notched bars of shifting forks slidably mounted on said bars, gear-set members associated with said forks and adapted to engage with said notched bars to lock said forks thereto, a control for said gear-set members and means for reciprocating said bars in opposite directions.

13. In a device for shifting gears the combination with two reciprocable bars, of shifting forks slidably mounted on said bars, gear-set members associated with said shifting forks and adapted to be engaged with said reciprocable bars, means for reciprocating said bars in opposite directions, and a control operable at any time to determine any connection of the gear-set members with the reciprocable bars independently of the position of the pedal.

14. Mechanism of the class described comprising a driving member, a driven member, means for effecting a variable speed ratio between said members, including a plurality of gears each having two driving positions and an intermediate neutral position, shifter forks connected with said gears, longitudinally movable rods passing through said shifter forks, means for securing said shifter forks to said rods in predetermined positions, means controlling said securing means, and apparatus for reciprocating said rods.

15. In a gear shifting device of the class described the combination with a sliding gear transmission mechanism of two longitudinally movable bars, means releasably connecting said bars with sliding gear members in said transmission mechanism, and means connected with a clutch pedal for reciprocating said bars simultaneously in opposite directions, upon the releasing stroke of said clutch pedal.

In testimony whereof I affix my signature in presence of two witnesses.

BAYARD E. RICHARDSON.

Witnesses:
FRANK E. LIVERANCE, Jr.,
H. H. YARRINGTON.